(12) United States Patent
Chaudhry et al.

(10) Patent No.: US 6,353,881 B1
(45) Date of Patent: Mar. 5, 2002

(54) SUPPORTING SPACE-TIME DIMENSIONAL PROGRAM EXECUTION BY SELECTIVELY VERSIONING MEMORY UPDATES

(75) Inventors: Shailender Chaudhry, Santa Clara; Marc Tremblay, Menlo Park, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/313,229

(22) Filed: May 17, 1999

(51) Int. Cl.[7] ............................. G06F 9/52; G06F 9/38; G06F 9/46
(52) U.S. Cl. ...................... 712/228; 712/206; 712/215; 712/23; 712/219; 712/27; 709/315; 709/316; 709/332; 709/107; 709/108; 711/168; 711/169
(58) Field of Search .............................. 712/200, 205, 712/209, 210, 211, 216, 217, 219, 226, 228, 233, 236, 237, 245, 248, 206, 41, 240, 23, 24, 218, 26, 27, 215, 212, 213, 242, 243; 709/108, 107, 315, 316, 332; 711/168, 169, 154, 155

(56) References Cited

U.S. PATENT DOCUMENTS

| | | | | |
|---|---|---|---|---|
| 5,872,990 A | | 2/1999 | Luick et al. | 395/800.24 |
| 5,896,528 A | * | 4/1999 | Katsuno et al. | 712/239 |
| 5,923,863 A | * | 7/1999 | Adler et al. | 712/234 |
| 5,961,639 A | | 8/1999 | Mallick et al. | 712/242 |
| 6,151,706 A | * | 11/2000 | Lo et al. | 717/19 |
| 6,182,210 B1 | * | 1/2001 | Akkary et al. | 712/235 |

FOREIGN PATENT DOCUMENTS

| | | |
|---|---|---|
| EP | 0725334 A1 | 8/1996 |
| GB | 2321544 | 7/1998 |
| WO | 99/31580 | 6/1999 |

OTHER PUBLICATIONS

Chen, et al.; "Exploiting Method–Level Parallelism in Single–Threaded Java Programs"; Proceedings of PACT '98; Oct. 12–18, 1998; Paris, France; 9 pages.

Gopal, et al...; "Speculative Versioning Cache"; To appear in the Fourth International Symposium on High–Performance Computer Architecture; pp. 1–11.

* cited by examiner

Primary Examiner—Daniel H. Pan
(74) Attorney, Agent, or Firm—Park, Vaughan & Fleming LLP

(57) ABSTRACT

A system is provided that facilitates space and time dimensional execution of computer programs through selective versioning of memory elements located in a system heap. The system includes a head thread that executes program instructions and a speculative thread that simultaneously executes program instructions in advance of the head thread with respect to the time dimension of sequential execution of the program. The collapsing of the time dimensions is facilitated by expanding the heap into two space-time dimensions, a primary dimension (dimension zero), in which the head thread operates, and a space-time dimension (dimension one), in which the speculative thread operates. In general, each dimension contains its own version of an object and objects created by the thread operating in the dimension. The head thread generally accesses a primary version of a memory element and the speculative thread generally accesses a corresponding space-time dimensioned version of the memory element. During a write by the head thread, the system performs the write to all dimensions of the memory element. Note that if the dimensions are collapsed at this address a single update will update all time dimensions. It also checks status information associated with the memory element to determine if the memory element has been read by the speculative thread. If so, the system causes the speculative thread to roll back so that the speculative thread can read a result of the write operation.

23 Claims, 5 Drawing Sheets

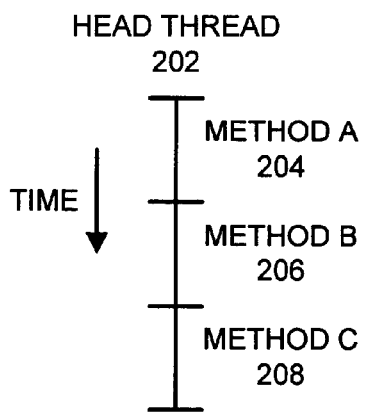
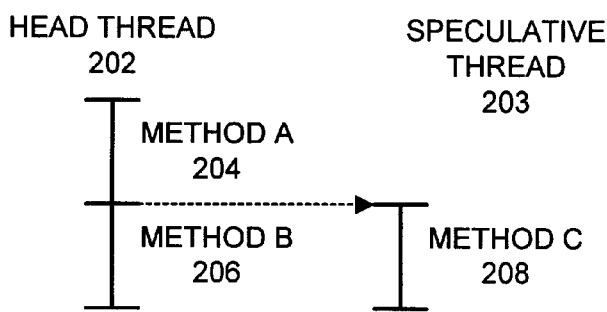
FIG. 2A (PRIOR ART)
FIG. 2B
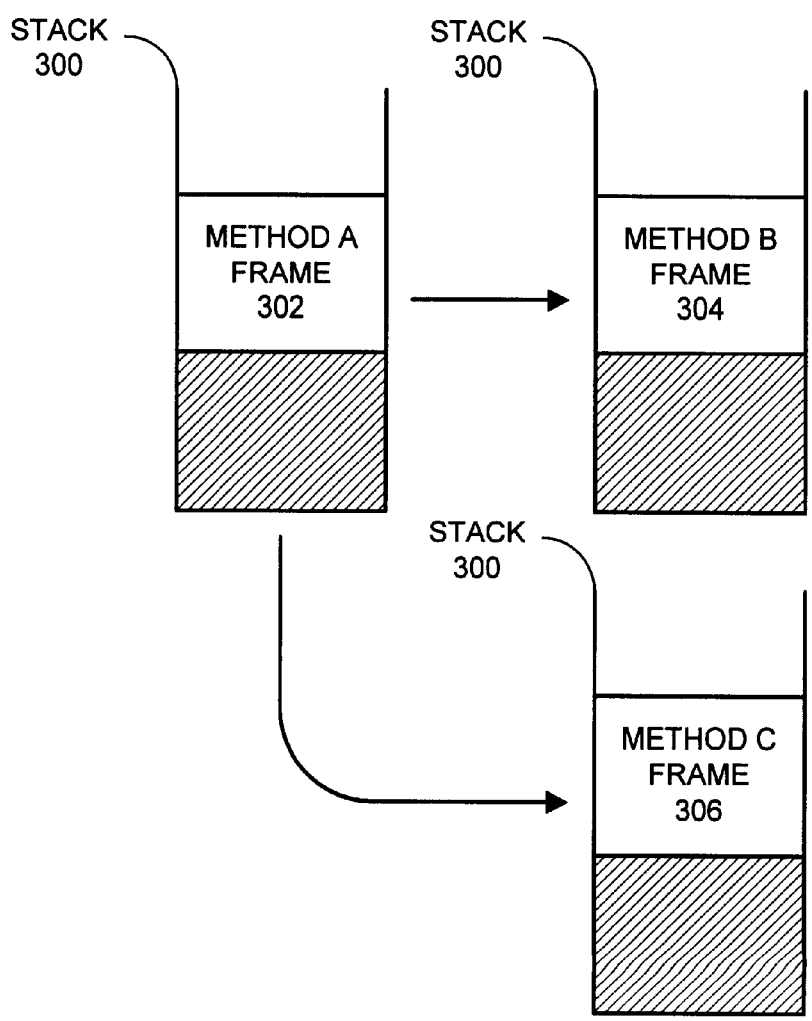
FIG. 3

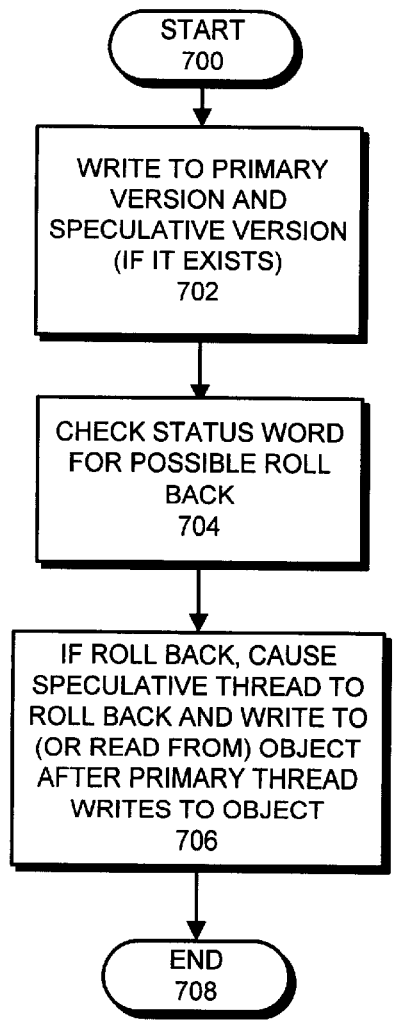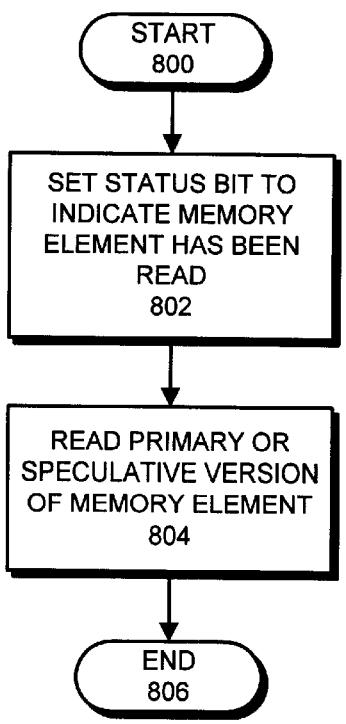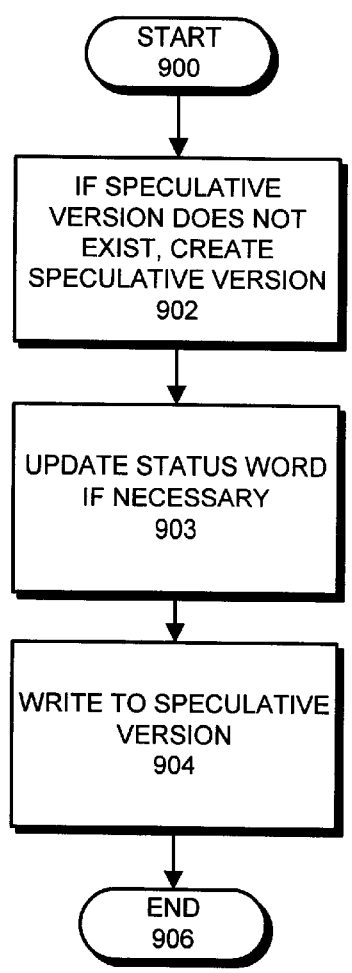
FIG. 7
FIG. 8
FIG. 9

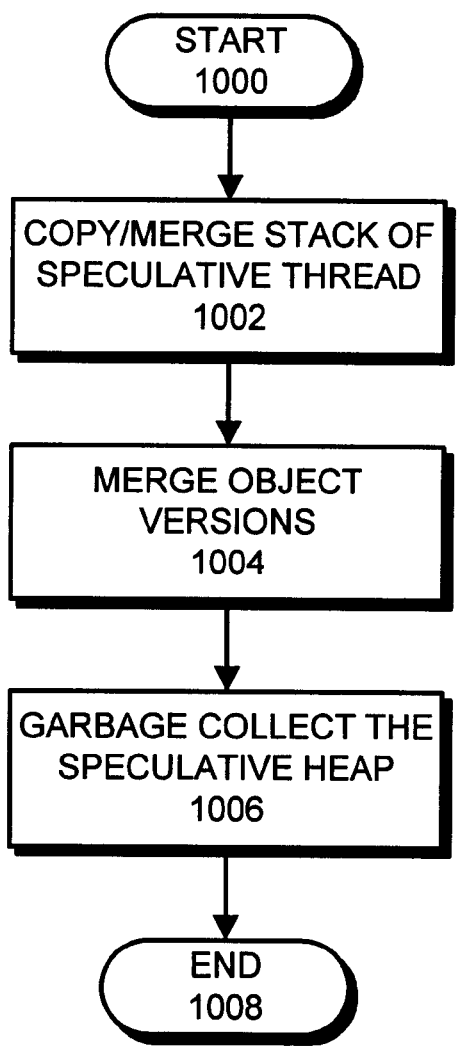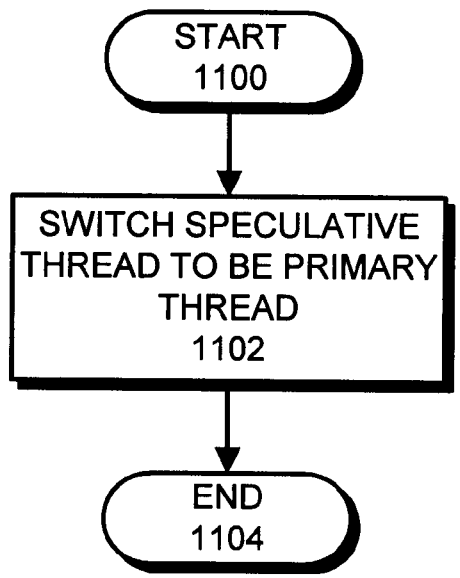
FIG. 10  FIG. 11

SUPPORTING SPACE-TIME DIMENSIONAL PROGRAM EXECUTION BY SELECTIVELY VERSIONING MEMORY UPDATES

RELATED APPLICATION

The subject matter of this application is related to the subject matter in a copending non-provisional application by the same inventors as the instant application and filed on the same day as the instant application entitled, "Facilitating Garbage Collection During Object Versioning for Space and Time Dimensional Computing," having serial number 09/313,243, and filing date May 17, 1999, now U.S. Pat. No. 6,247,027.

BACKGROUND

1. Field of the Invention

The present invention relates to techniques for improving computer system performance. More specifically, the present invention relates to a method and apparatus that provides selective versioning of memory objects to support space and time dimensional execution of a computer program.

2. Related Art

As increasing semiconductor integration densities allow more transistors to be integrated onto a microprocessor chip, computer designers are investigating different methods of using these transistors to increase computer system performance. Some recent computer architectures exploit "instruction level parallelism," in which a single central processing unit (CPU) issues multiple instructions in a single cycle. Given proper compiler support, instruction level parallelism has proven effective at increasing computational performance across a wide range of computational tasks. However, inter-instruction dependencies generally limit the performance gains realized from using instruction level parallelism to a factor of two or three.

Another method for increasing computational speed is "speculative execution" in which a processor executes multiple branch paths simultaneously, or predicts a branch, so that the processor can continue executing without waiting for the result of the branch operation. By reducing dependencies on branch conditions, speculative execution can increase the total number of instructions issued.

Unfortunately, conventional speculative execution typically provides a limited performance improvement because only a small number of instructions can be speculatively executed. One reason for this limitation is that conventional speculative execution is typically performed at the basic block level, and basic blocks tend to include only a small number of instructions. Another reason is that conventional hardware structures used to perform speculative execution can only accommodate a small number of speculative instructions.

What is needed is a method and apparatus that facilitates speculative execution of program instructions at a higher level of granularity so that many more instructions can be speculatively executed.

SUMMARY

One embodiment of the present invention provides a system that facilitates space and time dimensional execution of computer programs through selective versioning of memory elements located in a system heap. The system includes a head thread that executes program instructions and a speculative thread that simultaneously executes program instructions in advance of the head thread with respect to the time dimension of sequential execution of the program. The collapsing of the time dimensions is facilitated by expanding the heap into two space-time dimensions, a primary dimension (dimension zero), in which the head thread operates, and a space-time dimension (dimension one), in which the speculative thread operates. In general, each dimension contains its own versions of objects, and objects created by the thread operating in the dimension. The head thread generally accesses a primary version of a memory element and the speculative thread generally accesses a corresponding space-time dimensioned version of the memory element. During a write by the head thread, the system performs the write to all dimensions of the memory element. Note that if the dimensions are collapsed at this address a single update will update all space-time dimensions. It also checks status information associated with the memory element to determine if the memory element has been read by the speculative thread. If so, the system causes the speculative thread to roll back so that the speculative thread can read a result of the write operation.

In a variation on the above embodiment, during a read operation by the speculative thread, the thread first updates status information associated with the memory element to indicate that the memory element has been read by the speculative thread. Next, the thread reads the space-time dimensioned version of the memory element. If the space-time dimensions are collapsed into the primary version, the thread reads the primary version. If not, the thread reads the space-time dimensioned version.

In a variation on the above embodiment, during a write operation by the speculative thread to a memory element, the thread determines if the space-time dimensions are collapsed at the memory element. If so, the thread creates a new version of the memory element for the space-time dimension. Next, the thread performs the write operation to the memory element in the space-time dimension.

In a variation on the above embodiment, the system performs a join operation between the head thread and the speculative thread when the head thread reaches a point in the program where the speculative thread began executing. The join operation causes state associated with the speculative thread to be merged with state associated with the head thread and collapsing of the space-time dimensions of the heap.

Thus, the present invention can be thought of as speculating at a higher level than traditional speculative execution. At this higher level, the system speculates on the state of the heap; not on the outcome of a branch instruction or an instruction execution.

BRIEF DESCRIPTION OF THE FIGURES

FIG. 2A illustrates sequential execution of methods by a single thread.

FIG. 2B illustrates space and time dimensional execution of a method in accordance with an embodiment of the present invention.

FIG. 3 illustrates the state of the system stack during space and time dimensional execution of a method in accordance with an embodiment of the present invention.

FIG. 7 is a flow chart illustrating operations involved in performing a write to a memory element by a head thread in accordance with an embodiment of the present invention.

FIG. 8 is a flow chart illustrating operations involved in performing a read to a memory element by a speculative thread in accordance with an embodiment of the present invention.

FIG. 9 is a flow chart illustrating operations involved in performing a write to a memory element by a speculative thread in accordance with an embodiment of the present invention.

FIG. 10 is a flow chart illustrating operations involved in performing a join between a head thread and a speculative thread in accordance with an embodiment of the present invention.

FIG. 11 is a flow chart illustrating operations involved in performing a join between a head thread and a speculative thread in accordance with another embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave. For example, the carrier wave may carry information across a communications network, such as the Internet.

Computer System

Figure 1:
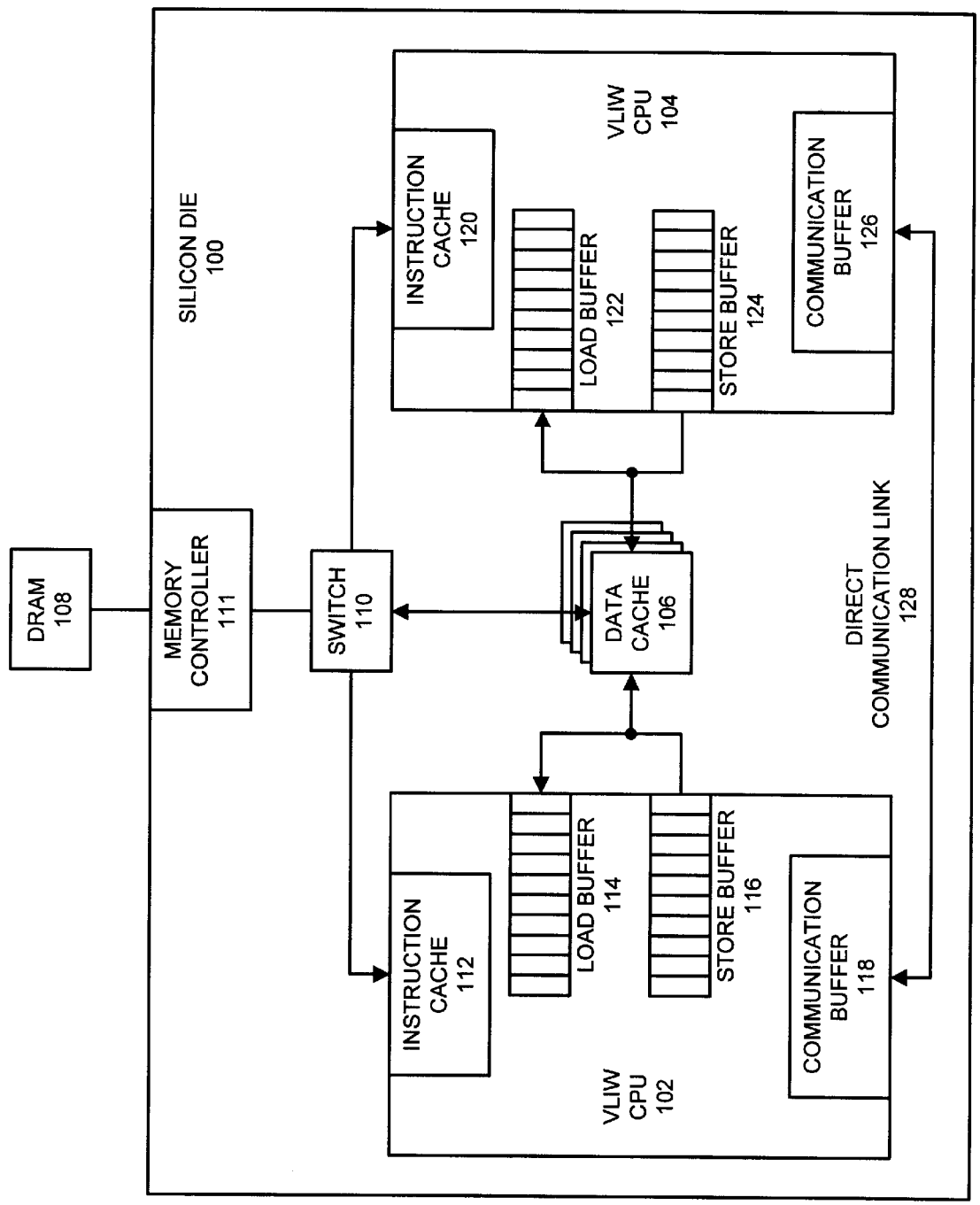
FIG. 1 illustrates a computer system including two central processing units sharing a common data cache in accordance with an embodiment of the present invention.

FIG. 1 illustrates a computer system including two central processing units (CPUs) 102 and 104 sharing a common data cache 106 in accordance with an embodiment of the present invention. In this embodiment, CPUs 102 and 104 and data cache 106 reside on silicon die 100. Note that CPUs 102 and 104 may generally be any type of computational devices that allow multiple threads to execute concurrently. In the embodiment illustrated in FIG. 1, CPUs 102 and 104 are very long instruction word (VLIW) CPUs, which support concurrent execution of multiple instructions executing on multiple functional units. VLIW CPUs 102 and 104 include instruction caches 112 and 120, respectively, containing instructions to be executed by VLIW CPUs 102 and 104.

VLIW CPUs 102 and 104 additionally include load buffers 114 and 122 as well as store buffers 116 and 124 for buffering communications with data cache 106. More specifically, VLIW CPU 102 includes load buffer 114 for buffering loads received from data cache 106, and store buffer 116 for buffering stores to data cache 106. Similarly, VLIW CPU 104 includes load buffer 122 for buffering loads received from data cache 106, and store buffer 124 for buffering stores to data cache 106.

VLIW CPUs 102 and 104 are additionally coupled together by direct communication link 128, which facilitates rapid communication between VLIW CPUs 102 and 104. Note that direct communication link 128 allows VLIW CPU 102 to write into communication buffer 126 within VLIW CPU 104. It also allows VLIW CPU 104 to write into communication buffer 118 within VLIW CPU 102.

In the embodiment illustrated in FIG. 1, Data cache 106 is fully dual-ported allowing concurrent read and/or write accesses from VLIW CPUs 102 and 104. This dual porting eliminates cache coherence delays associated with conventional shared memory architectures that rely on coherent caches.

In one embodiment of the present invention, data cache 106 is a 16K byte 4-way set-associative data cache with 32 byte cache lines.

Data cache 106, instruction caches 112 and instruction cache 120 are coupled through switch 110 to memory controller 111. Memory controller 111 is coupled to dynamic random access memory (DRAM) 108, which is located off chip. Switch 110 may include any type of circuitry for switching signal lines. In one embodiment of the present invention, switch 110 is a cross bar switch.

The present invention generally applies to any computer system that supports concurrent execution by multiple threads and is not limited to the illustrated computing system. However, note that data cache 106 supports fast accesses to shared data items. These fast accesses facilitate efficient sharing of status information between VLIW CPUs 102 and 104 to keep track of accesses to versions of memory objects.

Space-Time Dimensional Execution of Methods

FIG. 2A illustrates sequential execution of methods in a conventional computer system by a single head thread 202. In executing a program, head thread 202 executes a number of methods in sequence, including method A 204, method B 206 and method C 208.

In contrast, FIG. 2B illustrates space and time dimensional execution of a method in accordance with an embodiment of the present invention. In FIG. 2B, head thread 202 first executes method A 204 and then executes method B 206. (For this example, assume that method B 206 returns a void or some other value that is not used by method C 208. Alternatively, if method C 208 uses a value returned by method B206, assume that method C 208 uses a predicted return value from method B 206.)

As head thread 202 executes method B 206, speculative thread 203 executes method C 208 in a separate space-time dimension of the heap. If head thread 202 successfully executes method B 206, speculative thread 203 is joined with head thread 202. This join operation involves causing state associated with the speculative thread 203 to be merged with state associated with the head thread 202 and the collapsing of the space-time dimensions of the heap.

If speculative thread 203 for some reason encounters problems in executing method C 208, speculative thread 203 performs a rollback operation. This rollback operation allows speculative thread 203 to reattempt to execute method C 208. Alternatively, head thread 202 can execute method C 208 non-speculatively and speculative thread 203 can execute a subsequent method.

There are a number of reasons why speculative thread 203 may encounter problems in executing method C 208. One problem occurs when head thread 202 executing method B 206 writes a value to a memory element (object) after speculative thread 203 has read the same memory element. The same memory element can be read when the two space-time dimensions of the heap are collapsed at this memory element at the time of the read by speculative thread 203. In this case, speculative thread 203 should have read the value written by head thread 202, but instead has read a previous value. In this case, the system causes speculative thread 203 to roll back so that speculative thread 203 can read the value written by head thread 202.

Note that the term "memory element" generally refers to any unit of memory that can be accessed by a computer program. For example, the term "memory element" may refer to a bit, a byte or a word memory, as well as a data structure or an object defined within an object-oriented programming system.

FIG. 3 illustrates the state of the system stack during space and time dimensional execution of a method in accordance with an embodiment of the present invention. Note that since programming languages such as the Java programming language do not allow a method to modify the stack frame of another method, the system stack will generally be the same before method B 206 is executed as it is before method C 208 is executed. (This is not quite true if method B 206 returns a parameter through the system stack. However, return parameters are can be explicitly dealt with as is described below.) Referring the FIG. 3, stack 300 contains method A frame 302 while method A 204 is executing. When method A 204 returns, method B 206 commences and method A frame 302 is replaced by method B frame 304. Finally, when method B 206 returns, method C 208 commences and method B frame 304 is replaced by method C frame 306. Note that since stack 300 is the same immediately before method B 206 executed as it is immediately before method C 208 is executed, it is possible to execute method C 208 using a copy of stack 300 without first executing method B 206.

In order to undo the results of speculatively executed operations, updates to memory need to be versioned. The overhead involved in versioning all updates to memory can be prohibitively expensive due to increased memory requirements, decreased cache performance and additional hardware required to perform the versioning.

Fortunately, not all updates to memory need to be versioned. For example, updates to local variables—such as a loop counter—on a system stack are typically only relevant to the thread that is updating the local variables. Hence, even for speculative threads versioning updates to these local variables is not necessary.

When executing programs written in conventional programming languages, such as C, it is typically not possible to determine which updates are related to the heap, and which updates are related to the system stack. These programs are typically compiled from a high-level language representation into executable code for a specific machine architecture. This compilation process typically removes distinctions between updates to heap and system stack.

The same is not true for new platform-independent computer languages, such as the JAVA™ programming language distributed by SUN Microsystems, Inc. of Palo Alto, Calif. (Sun, the Sun logo, Sun Microsystems, and Java are trademarks or registered trademarks of Sun Microsystems, Inc. in the United States and other countries.) A program written in the Java programming language is typically compiled into a class file containing Java byte codes. This class file can be transmitted over a computer network to a distant computer system to be executed on the distant computer system. Java byte codes are said to be "platform-independent," because they can be executed across a wide range of computing platforms, so long as the computing platforms provide a Java virtual machine.

A Java byte code can be executed on a specific computing platform by using an interpreter or a just in time (JIT) compiler to translate the Java bytecode into machine code for the specific computing platform. Alternatively, a Java byte code can be executed directly on a Java bytecode engine running on the specific computing platform.

Fortunately, a Java bytecode contains more syntactic information than conventional machine code. In particular, the Java bytecodes differentiate between accesses to local variables in the system stack and accesses to the system heap. Furthermore, programs written in the Java programming language do not allow conversion between primitive and reference types. Such conversion can make it hard to differentiate accesses to the system stack from accesses to the system heap at compile time.

Data Structures to Support Space-Time Dimensional Execution

Figure 4:
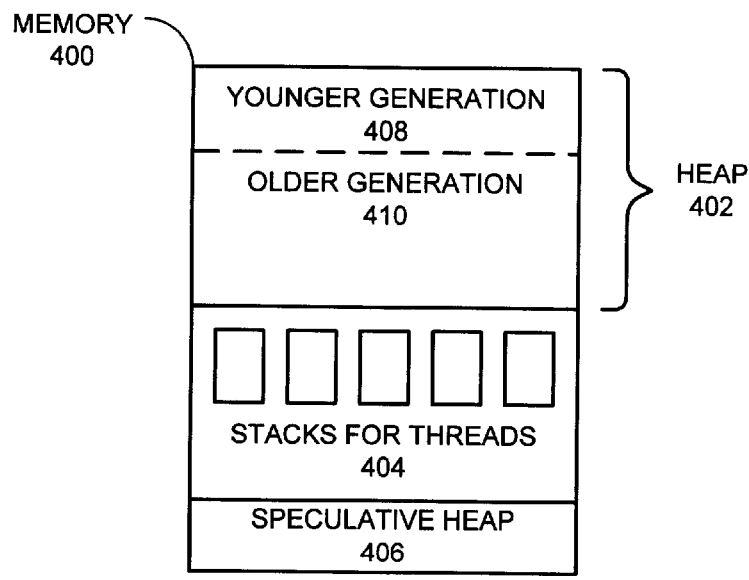
FIG. 4 illustrates how memory is partitioned between stack and heap in accordance with an embodiment of the present invention.
Figure 5:
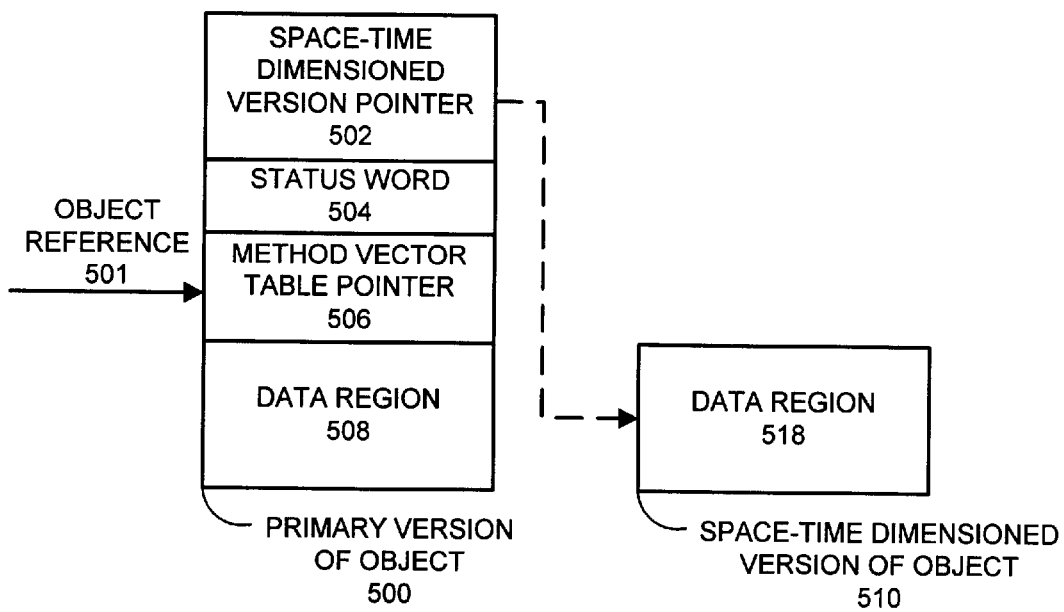
FIG. 5 illustrates the structure of a primary version and a space-time dimensioned version of an object in accordance with an embodiment of the present invention.

FIG. 4 illustrates how memory is partitioned between stack and heap in accordance with an embodiment of the present invention. In FIG. 4, memory 400 is divided into a number of regions including heap 402, stacks for threads 404 and speculative heap 406. Heap 402 comprises a region of memory from which objects are allocated. Heap 402 is further divided into younger generation region 408 and older generation region 410 for garbage collection purposes. For performance reasons, garbage collectors typically treat younger generation objects differently from older generation objects. Stack for threads 404 comprises a region of memory from which stacks for various threads are allocated. Speculative heap 406 contains the space-time dimensioned values of all memory elements where the two space-time dimensions of the heap are not collapsed. This includes space-time dimensional versions of objects, for example, version 510 of object 500 as shown in FIG. 5, and objects created by speculative thread 203. For garbage collection purposes, these objects created by speculative thread 203 can be treated as belonging to a generation that is younger than objects within younger generation region 408.

FIG. 5 illustrates the structure of a primary version of object 500 and a space-time dimensioned version of object 510 in accordance with an embodiment of the present invention.

Primary version of object 500 is referenced by object reference pointer 501. Like any object defined within an object-oriented programming system, primary version of object 500 includes data region 508, which includes one or more fields containing data associated with primary version of object 500. Primary version of object 500 also includes method vector table pointer 506. Method vector table pointer 506 points to a table containing vectors that point to the methods that can be invoked on primary version of object 500.

Primary version of object 500 also includes space-time dimensioned version pointer 502, which points to space-time dimensioned version of object 510, if the two space-time dimensions are not collapsed at this object. Note that in the illustrated embodiment of the present invention, space-time dimensioned version 510 is always referenced indirectly through space-time dimensioned version pointer 502. Primary version of object 500 additionally includes status word 504, which contains status information specifying which fields from data region 508 have been written to or read by speculative thread 203. Space-time dimensioned version of object 510 includes only data region 518.

Figure 6:
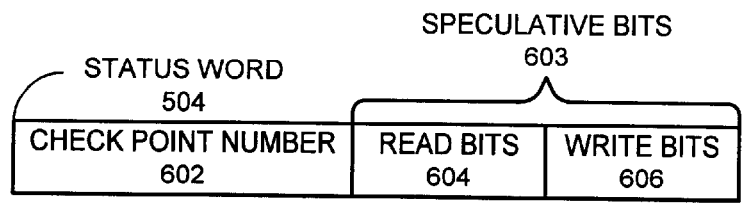
FIG. 6 illustrates the structure of a status word for an object in accordance with an embodiment of the present invention.

FIG. 6 illustrates the structure of status word 504 in accordance with an embodiment of the present invention. In this embodiment, status word 504 includes checkpoint number 602 and speculative bits 603. Speculative bits 603 includes read bits 604 and write bits 606. When status word 504 needs to be updated due to a read or a write by speculative thread 203, checkpoint number 602 is updated with the current time of the system. The current time in the time dimension of the system is advanced discretely at a join or a rollback. This allows checkpoint number 602 to be used as a qualifier for speculative bits 603. If checkpoint number 602 is less than the current time, speculative bits 603 can be interpreted as reset.

Read bits 604 keep track of which fields within data region 508 have been read since the last join or rollback. Correspondingly, write bits 606 keep track of which fields within data region 508 have been written since the last join or rollback. In one embodiment of the present invention, read bits 604 includes one bit for each field within data region 508. In another embodiment, read bits includes fewer bits than the number of fields within data region 508. In this embodiment, each bit within read bits 604 corresponds to more than one field in data region 508. For example, if there are eight read bits, each bit corresponds to every eighth field. Write bits 606 similarly can correspond to one or multiple fields within data region 508.

Space-Time Dimensional Update Process

Space-time dimensioning occurs during selected memory updates. For local variable and operand accesses to the system stack, no space-time dimensioned versions exist and nothing special happens. During read operations by head thread 202 to objects in the heap 402, again nothing special happens.

Special operations are involved in write operations by head thread 202 as well as read and write operations by speculative thread 203. These special operations are described in more detail with reference to FIGS. 7, 8 and 9 below.

FIG. 7 is a flow chart illustrating operations involved in a write operation to an object by a head thread 202 in accordance with an embodiment of the present invention. The system writes to the primary version of object 500 and the space-time dimensioned version of object 510 if the two space-time dimensions are not collapsed at this point (step 702). Next, the system checks status word 504 within primary version of object 500 to determine whether a rollback is required (step 704). A rollback is required if speculative thread 203 previously read the data element. The same memory element can be read when the two space-time dimensions of the heap are collapsed at this memory element at the time of the read by speculative thread 203. A rollback is also required if speculative thread 203 previously wrote to the object and thus ensured that the two dimensions of the object are not collapsed at this element, and if the current write operation updates both primary version of object 500 and space-time dimensioned version of object 510.

If a rollback is required, the system causes speculative thread 203 to perform a rollback operation (step 706). This rollback operation allows speculative thread 203 to read from (or write to) the object after head thread 202 writes to the object.

Note that in the embodiment of the present invention illustrated in FIG. 7 the system performs writes to both primary version 500 and space-time dimensioned version 510. In an alternative embodiment, the system first checks to determine if speculative thread 203 previously wrote to space-time dimensioned version 510. If not, the system writes to both primary version 500 and space-time dimensioned version 510. If so, the system only writes to primary version 500.

FIG. 8 is a flow chart illustrating operations involved in a read operation to an object by speculative thread 203 in accordance with an embodiment of the present invention. During this read operation, the system sets a status bit in status word 504 within primary version of object 500 to indicate that primary version 500 has been read (step 802). Speculative thread 203 then reads space-time dimensioned version 510, if it exists. Otherwise, speculative thread 203 reads primary version 500.

FIG. 9 is a flow chart illustrating operations involved in a write operation to a memory element by speculative thread 203 in accordance with an embodiment of the present invention. If a space-time dimensioned version 510 does not exist, the system creates a space-time dimensioned version 510 in speculative heap 406 (step 902). The system also updates status word 504 to indicate that speculative thread 203 has written to the object if such updating is necessary (step 903). The system next writes to space-time dimensioned version 510 (step 904). Such updating is necessary if head thread 202 must subsequently choose between writing to both primary version 500 and space-time dimensioned version 510, or writing only to primary version 500 as is described above with reference to FIG. 7.

FIG. 10 is a flow chart illustrating operations involved in a join operation between head thread 202 and a speculative thread 203 in accordance with an embodiment of the present invention. A join operation occurs for example when head thread 202 reaches a point in the program where speculative thread 203 began executing. The join operation causes state associated with the speculative thread 203 to be merged with state associated with the head thread 202. This involves copying and/or merging the stack of speculative thread 203 into the stack of head thread 202 (step 1002). It also involves merging space-time dimension and primary versions of objects (step 1004) as well as possibly garbage collecting speculative heap 406 (step 1006). In one embodiment of the present invention, one of threads 202 or 203 performs steps 1002 and 1006, while the other thread performs step 1004.

FIG. 11 is a flow chart illustrating operations involved in a join operation between head thread 202 and a speculative thread 203 in accordance with another embodiment of the present invention. In this embodiment, speculative thread 203 carries on as a pseudo-head thread. As a pseudo-head thread, speculative thread 203 uses indirection to reference space-time dimensioned versions of objects, but does not mark objects or create versions. While speculative thread 203 is acting as a pseudo-head thread, head thread 202 updates primary versions of objects.

Extension to Additional Speculative Threads

Although the present invention has been described for the case of a single speculative thread, the present invention can be extended to provide multiple speculative threads operating on multiple space-time dimensioned versions of a data object in parallel.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for updating information associated with a memory element in a system that supports space and time dimensional execution, the system having a head thread that executes program instructions and a speculative thread that executes program instructions in advance of the head thread, the head thread accessing a primary version of the memory element and the speculative thread accessing a space-time dimensioned version of the memory element, the method comprising:

initiating a memory access to the memory element; and
   if the memory access is a write operation by the head thread,
      performing the write operation to the primary version of the memory element,
      checking status information associated with the memory element to determine if the memory element has been read by the speculative thread,
         if the memory element has been read by the speculative
         thread, causing the speculative thread to roll back so that the
         speculative thread can read a result of the write operation, and
         if the memory element has not been read by the speculative thread, performing the write operation to the space-time dimensioned version of the memory element if the space-time dimensioned version exists.

2. The method of claim 1, further comprising if the memory access is a read operation by the speculative thread:
   determining if the space-time dimensioned version of the memory element exists;
   if the space-time dimensioned version of the memory element exists, reading the space-time dimensioned version of the memory element;
      if the space-time dimensioned version of the memory element does not exist, reading the primary version of the memory element; and
   updating status information associated with the memory element to indicate the memory element has been read by the speculative thread.

3. The method of claim 2, further comprising if the memory access is a write operation by the speculative thread:
   determining if the space-time dimensioned version of the memory element exists;
   if the space-time dimensioned version of the memory element does not exist, creating the space-time dimensioned version of the memory element; and
   performing the write operation to the space-time dimensioned version of the memory element.

4. The method of claim 1, wherein the memory element includes an object defined within an object-oriented programming system.

5. The method of claim 1, wherein accesses to the space-time dimensioned version of the memory element are made indirectly through a pointer associated with the primary version of the memory element.

6. The method of claim 1, wherein the act of performing the write operation to the space-time dimensioned version of the memory element further comprises:
   checking status information associated with the memory element to determine if the space-time dimensioned version of the memory element has been written by the speculative thread; and
   writing to the space-time dimensioned version of the memory element only if the speculative thread has not written to the space-time dimensioned version of the memory element.

7. The method of claim 1, wherein if the memory access is a write operation by the head thread, the method further comprises:
   performing the write operation to the space-time dimensioned version of the memory element;
   checking status information associated with the memory element to determine if the space-time dimensioned version of the memory element has been written by the speculative thread; and
   if the space-time dimensioned version of the memory element has been written by the speculative thread, causing the speculative thread to roll back so that the speculative thread can perform the write operation again in order to undo the write operation to the space-time dimensioned version of the memory element by the head thread.

8. The method of claim 1, further comprising performing a join operation between the head thread and the speculative thread when the head thread reaches a point in the program where the speculative thread began executing, the join operation causing state associated with the speculative thread to be merged with state associated with the head thread.

9. The method of claim 8, wherein performing the join operation includes merging the space-time dimensioned version of the memory element into the primary version of the memory element and discarding the space-time dimensioned version of the memory element.

10. The method of claim 8, wherein performing the join operation includes causing the speculative thread to continue executing as a new head thread and causing the head thread to continue executing as a new speculative thread.

11. A method for updating information associated with a memory element in a system that supports space and time dimensional execution, the system having a head thread that executes program instructions and a speculative thread that executes program instructions in advance of the head thread, the head thread accessing a primary version of the memory element and the speculative thread accessing a space-time dimensioned version of the memory element, wherein the memory element includes an object defined within an object-oriented programming system, the method comprising:

initiating a memory access to the memory element; and
   if the memory access is a write operation by the head thread,
      performing the write operation to the primary version of the memory element,
      checking status information associated with the memory element to determine if the memory element has been read by the speculative thread,
         if the memory element has been read by the speculative thread, causing the speculative thread to roll back so that the speculative thread can read a result of the write operation, and
         if the memory element has not been read by the speculative thread, performing the write operation to the space-time dimensioned version of the memory element if the space-time dimensioned version exists;

if the memory access is a read operation by the speculative thread,
    determining if the space-time dimensioned version of the memory element exists,
    if the space-time dimensioned version of the memory element exists, reading the space-time dimensioned version of the memory element,
    if the space-time dimensioned version of the memory element does not exist, reading the primary version of the memory element, and
        updating status information associated with the memory element to indicate the memory element has been read by the speculative thread;
if the memory access is a write operation by the speculative thread,
    determining if the space-time dimensioned version of the memory element exists,
    if the space-time dimensioned version of the memory element does not exist, creating the space-time dimensioned version of the memory element, and
    performing the write operation to the space-time dimensioned version of the memory element; and
performing a join operation between the head thread and the speculative thread when the head thread reaches a point in a program where the speculative thread began executing, the join operation causing state associated with the speculative thread to be merged with state associated with the head thread;
wherein accesses to the space-time dimensioned version of the memory element are made indirectly through a pointer associated with the primary version of the memory element.

12. An apparatus that supports space and time dimensional execution of a program, comprising:
    a head thread that executes program instructions and accesses a primary version of a memory element;
    a speculative thread that executes program instructions in advance of the head thread and that accesses a space-time dimensioned version of the memory element;
    a mechanism that performs write operations for the head thread, the mechanism being configured to,
        perform a write operation to the primary version of the memory element,
        check status information associated with the memory element to determine if the memory element has been read by the speculative thread,
    cause the speculative thread to roll back so that the speculative thread can read a result of the write operation if the memory element has been read by the speculative thread, and
    perform the write operation to the space-time dimensioned version of the memory element if the space-time dimensioned version exists and if the memory element has not been read by the speculative thread.

13. The apparatus of claim 12, further comprising a mechanism that performs read operations for the speculative thread that is configured to:
    determine if the space-time dimensioned version of the memory element exists;
    read the space-time dimensioned version of the memory element if the space-time dimensioned version of the memory element exists;
    read the primary version of the memory element if the space-time dimensioned version of the memory element does not exist; and
    update status information associated with the memory element to indicate the memory element has been read by the speculative thread.

14. The apparatus of claim 13, further comprising a mechanism that performs write operations for the speculative thread that is configured to:
    determine if the space-time dimensioned version of the memory element exists;
    create the space-time dimensioned version of the memory element if the space-time dimensioned version of the memory element does not exist; and
    perform the write operation to the space-time dimensioned version of the memory element.

15. The apparatus of claim 12, wherein the memory element includes an object defined within an object-oriented programming system.

16. The apparatus of claim 12, wherein the apparatus is configured to access the space-time dimensioned version of the memory element indirectly through a pointer associated with the primary version of the memory element.

17. The apparatus of claim 12, wherein the mechanism that performs write operations for the speculative thread is further configured to:
    check status information associated with the memory element to determine if the space-time dimensioned version of the memory element has been written by the speculative thread; and
    write to the space-time dimensioned version of the memory element only if the speculative thread has not written to the space-time dimensioned version of the memory element.

18. The apparatus of claim 12, wherein the mechanism that performs write operations for the head thread is configured to:
    perform the write operation to the space-time dimensioned version of the memory element;
    check status information associated with the memory element to determine if the memory element has been written by the speculative thread; and
    cause the speculative thread to roll back so that the speculative thread can perform the write operation again if the memory element has been written by the speculative thread in order to undo the write operation to the space-time dimensioned version of the memory element by the head thread.

19. The apparatus of claim 12, further comprising a mechanism to perform a join operation between the head thread and the speculative thread when the head thread reaches a point in the program where the speculative thread began executing, the join operation causing state associated with the speculative thread to be merged with state associated with the head thread.

20. The apparatus of claim 19, wherein the mechanism to perform the join operation is configured to merge the space-time dimensioned version of the memory element into the primary version of the memory element and to discard the space-time dimensioned version of the memory element.

21. The apparatus of claim 19, wherein the mechanism to perform the join operation is configured to cause the speculative thread to continue executing as a new head thread and to cause the head thread to continue executing as a new speculative thread.

22. A computer readable storage medium containing a data structure that supports space and time dimensional execution using a head thread that executes program instructions and a speculative thread that executes program instructions in advance of the head thread, the data structure comprising:

a data storage area for storing data to be operated on by the program instructions;

a space-time dimensioned version pointer that points to a space-time dimensioned version of the data structure that is operated on by the speculative thread, wherein the space-time dimensioned version pointer points self-referentially back to the data structure if the data structure is a space-time dimensioned version of the data structure; and status information that indicates whether the space-time dimensioned version of the data storage area has been written to or read by the speculative thread.

23. The computer readable storage medium containing a data structure of claim 22, wherein the data structure is an object defined within an object-oriented programming system, and further comprising a method vector table pointer that facilitates references to methods that access the data storage area.

* * * * *